(12) United States Patent
Cooley et al.

(10) Patent No.: US 8,353,371 B2
(45) Date of Patent: Jan. 15, 2013

(54) POLYCRYSTALLINE DIAMOND COMPACT INCLUDING A SUBSTRATE HAVING A RAISED INTERFACIAL SURFACE BONDED TO A LEACHED POLYCRYSTALLINE DIAMOND TABLE, AND APPLICATIONS THEREFOR

(75) Inventors: Craig H. Cooley, Saratoga Springs, UT (US); Jair J. Gonzalez, Provo, UT (US)

(73) Assignee: US Synthetic Corporation, Orem, UT (US)

( * ) Notice: Subject to any disclaimer, the term of this patent is extended or adjusted under 35 U.S.C. 154(b) by 313 days.

(21) Appl. No.: 12/626,139

(22) Filed: Nov. 25, 2009

(65) Prior Publication Data
US 2011/0120782 A1 May 26, 2011

(51) Int. Cl.
*E21B 10/36* (2006.01)
*E21B 10/42* (2006.01)

(52) U.S. Cl. .............. 175/433; 175/420.1; 175/426; 175/428; 175/432

(58) Field of Classification Search .............. 175/405.1, 175/420.1, 426, 428, 432, 433, 434
See application file for complete search history.

(56) References Cited

U.S. PATENT DOCUMENTS

| | | | |
|---|---|---|---|
| 4,268,276 A | 5/1981 | Bovenkerk | |
| 4,274,900 A | 6/1981 | Mueller et al. | |
| 4,410,054 A | 10/1983 | Nagel et al. | |
| 4,468,138 A | 8/1984 | Nagel | |
| 4,560,014 A | 12/1985 | Geczy | |
| 4,738,322 A | 4/1988 | Hall et al. | |
| 4,811,801 A | 3/1989 | Salesky et al. | |
| 4,913,247 A | 4/1990 | Jones | |
| 5,016,718 A | 5/1991 | Tandberg | |
| 5,092,687 A | 3/1992 | Hall | |
| 5,120,327 A | 6/1992 | Dennis | |
| 5,135,061 A | 8/1992 | Newton, Jr. | |
| 5,154,245 A | 10/1992 | Waldenstrom et al. | |
| 5,355,969 A | 10/1994 | Hardy et al. | |
| 5,364,192 A | 11/1994 | Damm et al. | |
| 5,368,398 A | 11/1994 | Damm et al. | |
| 5,460,233 A | 10/1995 | Meany et al. | |
| 5,480,233 A | 1/1996 | Cunningham | |
| 5,544,713 A | 8/1996 | Dennis | |
| 5,875,862 A | 3/1999 | Jurewicz et al. | |

(Continued)

OTHER PUBLICATIONS

U.S. Appl. No. 61/309,488, filed Mar. 2, 2010, Gonzalez, et al.

(Continued)

*Primary Examiner* — Cathleen Hutchins
(74) *Attorney, Agent, or Firm* — Workman Nydegger

(57) ABSTRACT

In various embodiments, a polycrystalline diamond compact ("PDC") comprises a substrate including an interfacial surface having a raised region. The PDC comprises a polycrystalline diamond ("PCD") table bonded to the interfacial surface of the substrate. The PCD table defines an upper surface and exhibits a thickness over the raised region. The PCD table includes a plurality of bonded diamond grains defining a plurality of interstitial regions. A first region of the PCD table adjacent to the substrate includes metal-solvent catalyst disposed interstitially between the bonded diamond grains thereof, and a leached second region of the PCD table extends inwardly from the upper surface. The interstitial regions of the leached second region are depleted of metal-solvent catalyst. The geometry of the PCD table and raised region may be selected so that residual compressive stresses therein are retained to a sufficient level after leaching to provide a damage tolerant/thermally-stable PCD table.

37 Claims, 11 Drawing Sheets

U.S. PATENT DOCUMENTS

| | | |
|---|---|---|
| 6,330,924 B1 | 12/2001 | Hall |
| 6,544,308 B2 | 4/2003 | Griffin et al. |
| 6,793,681 B1 | 9/2004 | Pope et al. |
| 7,108,598 B1 | 9/2006 | Galloway |
| 7,475,744 B2 | 1/2009 | Pope |
| 7,493,972 B1 | 2/2009 | Schmidt et al. |
| 7,517,589 B2 | 4/2009 | Eyre |
| 7,681,669 B2 | 3/2010 | Cannon et al. |
| 7,730,977 B2 * | 6/2010 | Achilles ................ 175/434 |
| 7,754,333 B2 | 7/2010 | Eyre et al. |
| 7,757,790 B1 | 7/2010 | Schmidth et al. |
| 7,980,334 B2 | 7/2011 | Voronin et al. |
| 2006/0157286 A1 | 7/2006 | Pope |
| 2007/0079994 A1 * | 4/2007 | Middlemiss ................ 175/426 |
| 2007/0181348 A1 * | 8/2007 | Lancaster et al. ............ 175/432 |
| 2010/0294571 A1 | 11/2010 | Belnap et al. |
| 2011/0036641 A1 * | 2/2011 | Lyons ................ 175/432 |

OTHER PUBLICATIONS

U.S. Appl. No. 13/037,548, filed Mar. 1, 2011, Gonzalez, et al.

Vail et al., U.S. Appl. No. 12/185,457, "Methods of Fabricating Polycrystalline Diamond With a Carbonate Material Including at Least One Alkali Metal Carbonate, Polycrystalline Diamond So-Formed, and Applications Therefor" filed Aug. 4, 2008.

U.S. Appl. No. 13/037,548, filed Oct. 9, 2012, Office Action.

* cited by examiner

POLYCRYSTALLINE DIAMOND COMPACT INCLUDING A SUBSTRATE HAVING A RAISED INTERFACIAL SURFACE BONDED TO A LEACHED POLYCRYSTALLINE DIAMOND TABLE, AND APPLICATIONS THEREFOR

BACKGROUND

Wear-resistant, polycrystalline diamond compacts ("PDCs") are utilized in a variety of mechanical applications. For example, PDCs are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly known as a diamond table. The diamond table is formed and bonded to a substrate using a high-pressure/high-temperature ("HPHT") process. The PDC cutting element may be brazed directly into a preformed pocket, socket, or other receptacle formed in a bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a cemented carbide substrate into a container with a volume of diamond particles positioned on a surface of the cemented carbide substrate. A number of such containers may be loaded into an HPHT press. The substrate(s) and volume(s) of diamond particles are then processed under HPHT conditions in the presence of a catalyst material that causes the diamond particles to bond to one another to form a matrix of bonded diamond grains defining a polycrystalline diamond ("PCD") table. The catalyst material is often a metal-solvent catalyst (e.g., cobalt, nickel, iron, or alloys thereof) that is used for promoting intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a metal-solvent catalyst to promote intergrowth between the diamond particles, which results in formation of a matrix of bonded diamond grains having diamond-to-diamond bonding therebetween. Interstitial regions between the bonded diamond grains are occupied by the metal-solvent catalyst.

The presence of the metal-solvent catalyst in the PCD table is believed to reduce the thermal stability of the PCD table at elevated temperatures experienced during drilling a subterranean rock formation. For example, the difference in thermal expansion coefficient between the diamond grains and the metal-solvent catalyst is believed to lead to chipping or cracking of the PCD table during drilling or cutting operations, which consequently can degrade the mechanical properties of the PCD table or cause failure. Additionally, some of the diamond grains can undergo a chemical breakdown or back-conversion to graphite via interaction with the metal-solvent catalyst.

One conventional approach for improving the thermal stability of PDCs is to at least partially remove the metal-solvent catalyst from the PCD table of the PDC by acid leaching. Despite the availability of a number of different PDCs, manufacturers and users of PDCs continue to seek improved thermally stable PDCs.

SUMMARY

Embodiments of the invention relate to PDCs comprising a substrate including an interfacial surface having a raised region and a leached PCD table bonded to the interfacial surface. The geometry of the PCD table and the raised region may be selected so that residual compressive stresses in the PCD table are retained to a sufficient level after leaching to provide a damage tolerant and thermally-stable PCD table. For example, a thickness of the PCD table over the raised region and the geometry of the raised region may be selected so that residual compressive stresses in the PCD table are retained to a sufficient level after leaching to provide a damage tolerant and thermally-stable PCD table.

In various embodiments, a PDC comprises a substrate including an interfacial surface having a raised region. The PDC further comprises a PCD table bonded to the interfacial surface of the substrate. The PCD table defines an upper surface and exhibits a thickness over the raised region. The PCD table includes a plurality of bonded diamond grains defining a plurality of interstitial regions. A first region of the PCD table adjacent to the substrate includes metal-solvent catalyst disposed interstitially between the bonded diamond grains thereof. A leached second region of the PCD table extends inwardly from the upper surface. The interstitial regions of the leached second region are depleted of metal-solvent catalyst. In some embodiments, the thickness over the raised region may be about 1900 μm or less. In some embodiments, a ratio of the volume of the raised region to the volume of the PCD table may be greater than or equal to 0.15. In some embodiments, a ratio of the maximum height of the raised region to a maximum thickness of the PCD table may be greater than or equal to 0.20. In some embodiments, the surface area of the raised region may be 60% or more of the interfacial surface of the substrate.

Other embodiments include applications utilizing the disclosed PDCs in various articles and apparatuses, such as rotary drill bits, machining equipment, and other articles and apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Embodiments of the invention relate to PDCs comprising a substrate including an interfacial surface having a raised region and a leached PCD table bonded to the interfacial surface. The geometry of the PCD table and the raised region may be selected so that residual compressive stresses in the PCD table are retained to a sufficient level after leaching to provide a damage tolerant and thermally-stable PCD table. For example, a thickness (e.g., a minimum thickness) of the PCD table over the raised region and the geometry of the raised region may be selected so that residual compressive stresses in the PCD table are retained to a sufficient level even after leaching the PCD table to provide a damage tolerant and thermally-stable PCD table. The disclosed PDCs may be used in a variety of applications, such as rotary drill bits, machining equipment, and other articles and apparatuses.

Figure 1A:
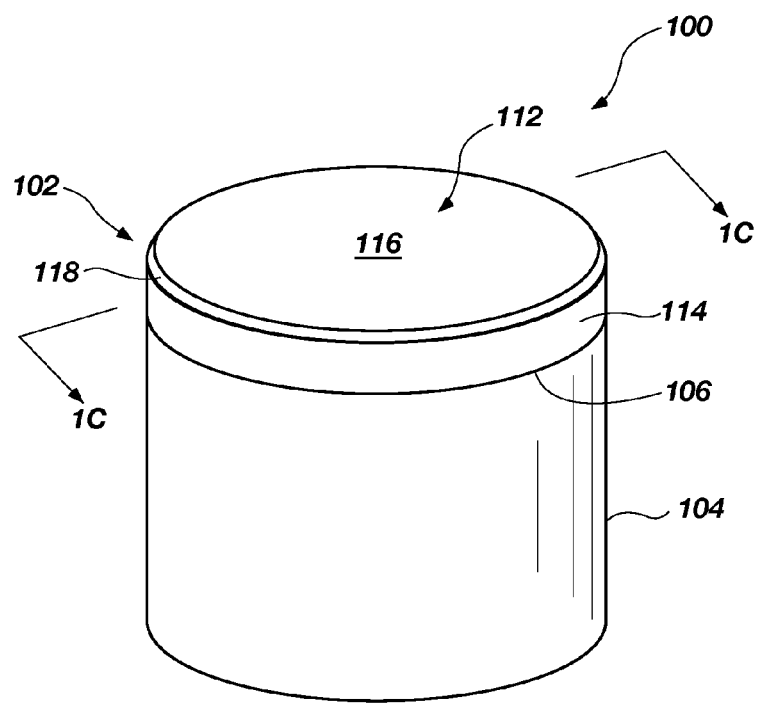
FIG. 1A is an isometric view of an embodiment of a PDC comprising a substrate including an interfacial surface having a raised region and a leached PCD table.
Figure 1B:
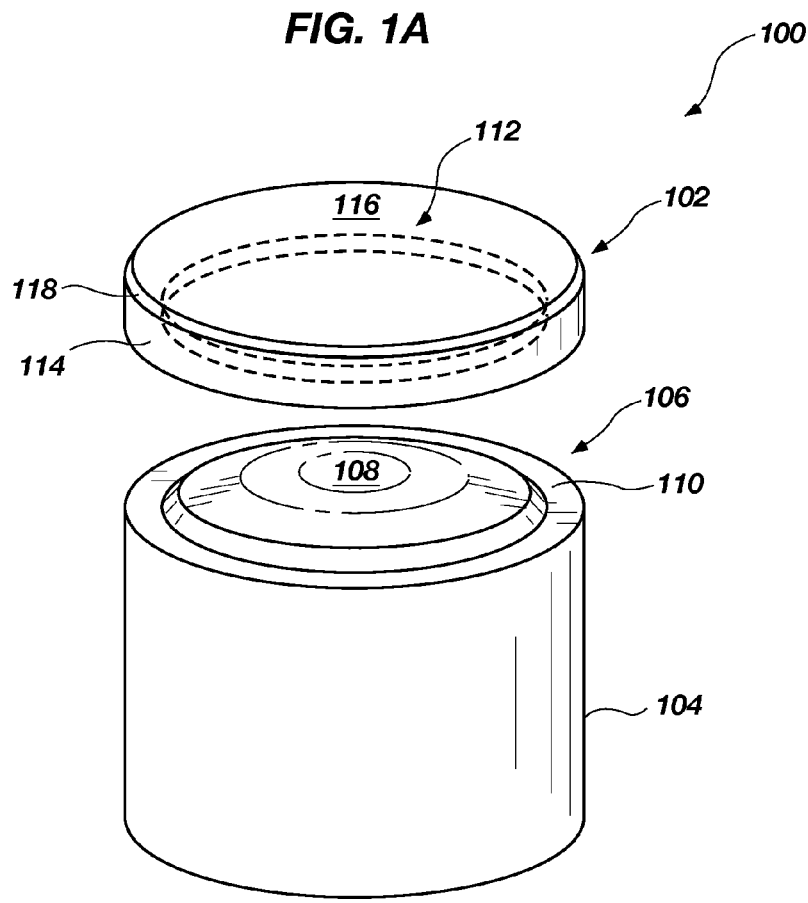
FIG. 1B is an exploded isometric view of the PDC shown in FIG. 1A.
Figure 1C:
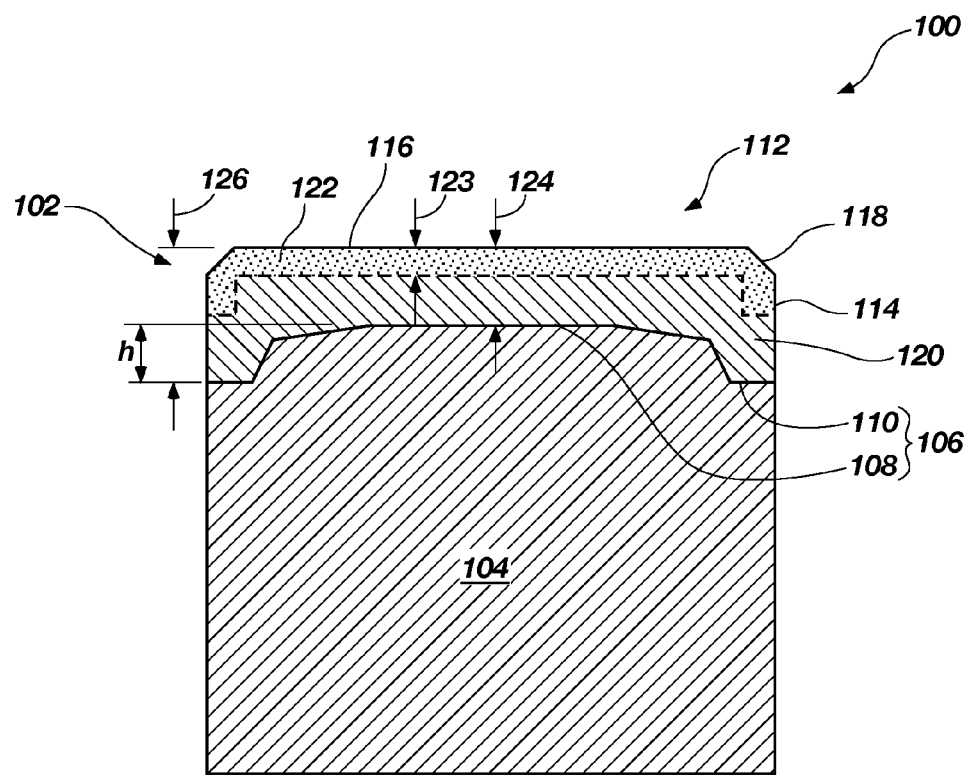
FIG. 1C is a cross-sectional view of the PDC shown in FIG. 1A taken along line 1C-1C thereof.

FIGS. 1A-1C are isometric, exploded, and cross-sectional views, respectively, of an embodiment of a PDC 100. The PDC 100 includes a PCD table 102 and a substrate 104 having an interfacial surface 106 that is bonded to the PCD table 102. For example, the substrate 104 may comprise a cemented carbide substrate, such as tungsten carbide, tantalum carbide, vanadium carbide, niobium carbide, chromium carbide, titanium carbide, or combinations of the foregoing carbides cemented with iron, nickel, cobalt, or alloys thereof. In an embodiment, the cemented carbide substrate may comprise a cobalt-cemented tungsten carbide substrate.

Referring specifically to FIGS. 1B and 1C, the interfacial surface 106 of the substrate 104 includes a raised region 108 and a peripheral region 110 extending about the raised region 108. The raised region 108 projects above the peripheral region 110 to a maximum distance "h." For example, the distance "h" may be about 500 μm to about 2540 μm, about 760 μm to about 1900 μm, or about 1140 μm to about 1520 μm. In the illustrated embodiment, the raised region 108 is a body exhibiting a polygonal cross-sectional geometry that is bonded to the PCD table 102. However, the raised region 108 may exhibit other selected geometries, such as a raised body having an ovoid geometry, a raised body having an elliptical geometry, a raised body having a generally hemispherical geometry with a generally semicircular cross-sectional geometry, a truncated convex body (e.g., a truncated generally hemispherical body), or another suitable raised body that may be truncated or un-truncated.

The PCD table 102 includes a plurality of directly bonded-together diamond grains exhibiting diamond-to-diamond bonding (e.g., $sp^3$ bonding) therebetween. The plurality of directly bonded-together diamond grains define a plurality of interstitial regions. The PCD table 102 defines a working upper surface 112 and peripheral surface 114. In the illustrated embodiment, the upper surface 112 includes a substantially planar major surface 116 and a peripherally-extending chamfer 118 that extends between the peripheral surface 114 and the major surface 116. In an embodiment, the PCD table 102 may be formed on the substrate 104 (i.e., integrally formed with the substrate 104) by HPHT sintering diamond particles on the substrate 104. In another embodiment, the PCD table 102 may be a pre-sintered PCD table, such as an at least partially leached PCD table that is bonded to the substrate 104 in an HPHT process by infiltration of metal-solvent catalyst therein from the substrate 104 or other source that is subsequently leached therefrom.

Referring specifically to FIG. 1C, the PCD table 102 includes a first region 120 adjacent to the interfacial surface 106 of the substrate 104. Metal-solvent catalyst infiltrated from the substrate 104 during HPHT processing occupies the interstitial regions of the first region of the PCD table 102. For example, the metal-solvent catalyst may be cobalt from a cobalt-cemented tungsten carbide substrate that infiltrated into the first region 120. The PCD table 102 also includes a leached second region 122 remote from the substrate 104 that includes the major surface 116, the chamfer 118, and a portion of the peripheral surface 114. The leached second region 122 extends inwardly to a selected depth or depths from the major surface 116, the chamfer 118, and a portion of the peripheral surface 114.

The leached second region 122 has been leached to deplete the metal-solvent catalyst therefrom that used to occupy the interstitial regions between the bonded diamond grains of the leached second region 122. The leaching may be performed in a suitable acid (e.g., aqua regia, nitric acid, hydrofluoric acid, or combinations thereof) so that the leached second region 122 is substantially free of the metal-solvent catalyst. As a result of the metal-solvent catalyst being depleted from the leached second region 122, the leached second region 122 is relatively more thermally stable that the underlying first region 120. Generally, a maximum leach depth 123 may be greater than 250 μm. For example, the maximum leach depth 123 for the leached second region 122 may be greater than 300 μm to about 425 μm, greater than 350 μm to about 400 μm, greater than 350 μm to about 375 μm, about 375 μm to about 400 μm, or about 500 μm to about 650 μm. The maximum leach depth 123 may be measured inwardly from at least one of the major surface 116, the chamfer 118, or the peripheral surface 114.

The PCD table 102 exhibits a non-uniform thickness 124 over the raised region 108. In the illustrated embodiment, the thickness 124 is the minimum thickness of the PCD table 102 and is located immediately over the upper most portion of the raised region 108 as measured from the major surface 116. However, the thickness 124 may be used to represent any cross-sectional thickness of the PCD table 102 over the raised region 108. A maximum thickness 126 of the PCD table 102 is located immediately over the peripheral region 110 as measured from the major surface 116. The thickness 124 may be about 1900 µm or less, about 500 µm to about 1500 µm, about 500 µm to about 1000 µm, about 500 µm to about 800 µm, or about 750 µm to about 950 µm. The maximum thickness 126 of the PCD table 102 in the peripheral region 110 may be about 1.5 to about 3 times greater than the thickness 124 of the PCD table 102 in the non-peripheral raised region 108, such as about 1125 µm to about 5700 µm, about 2285 µm to about 3000 µm, or about 2285 µm to about 3500 µm. A ratio of the thickness 124 of the PCD table 102 to the maximum leach depth 123 may be about 1.25 to about 8.0, about 1.25 to about 6.5, about 1.25 to about 4.0, or about 2.0 to about 5.0.

In some embodiments, the ratio of the maximum distance "h" to the maximum thickness 126 of the PCD table 102 is greater than or equal to 0.2. For example, the ratio of the maximum distance "h" to the maximum thickness 126 of the PCD table 102 may be about 0.2 to about 0.5, about 0.4 to about 0.5, about 0.45 to about 0.55, about 0.52 to about 0.58.

In some embodiments, the ratio of the volume of the raised region 108 to the volume of the PCD table 102 is greater than or equal to 0.15. For example, the ratio of the volume of the raised region 108 to the volume of the PCD table 102 may be about 0.15 to about 0.50, about 0.20 to about 0.30, about 0.25 to about 0.45, or about 0.35 to about 0.50.

In some embodiments, the surface area of the raised region 108 may be about 60% or more of the surface area of the interfacial surface 106. For example, the surface area of the raised region 108 may be about 60% to about 85%, about 65% to about 75%, or about 70% to about 75% of the surface area of the interfacial surface 106.

It is noted that embodiments for the PDC 100 may exhibit any suitable combination of aforementioned characteristics. For example, the PDC 100 may exhibit any suitable combination of the disclosed thicknesses and/or thickness ranges for the thickness 124, maximum thicknesses 126 and/or thickness ranges for the maximum thickness 126, ratios and/or ratio ranges for the ratio of the thickness 124 to the maximum leach depth 123, ratios or ratio ranges for the ratio of the maximum distance "h" to the maximum thickness 126 of the PCD table 102, ratios or ratio ranges for the ratio of volume of the raised region 108 to the volume of the PCD table 102, and the surface area of the raised region 108 relative to the surface area of the interfacial surface 106.

Because the metal-solvent catalyst that previously occupied the interstitial regions of the leached second region 122 has a significantly higher coefficient of thermal expansion than that of the diamond grains, the PCD table 102 exhibits relatively high radial compressive stresses at and near the raised region 108 of the substrate 104. In other words, during cooling from the HPHT sintering process used to sinter and/or bond the PCD table 110 to the substrate 104, the metal-solvent catalyst in the PCD table 110 contracts more rapidly during cooling and induces radial compressive stresses in the PCD table 110 at and near the raised region 108.

Depleting the metal-solvent catalyst via leaching to form the leached second region 122 relieves some of the residual radial compressive stresses. High residual radial compressive stresses are typically desirable in a PCD table to help prevent crack propagation therein. Conventionally, after leaching, the radial compressive stresses can be relieved to such an extent that the PCD table 102 is significantly less damage tolerant, such as a reduced impact resistance and/or a reduced fracture toughness. However, the raised region 108 of the interfacial surface 106 of the substrate 104 in combination with the reduced cross-sectional area of the PCD table 102 over the raised region 108 results in significantly higher radial compressive stresses in the PCD table 102 that if the interfacial surface 106 were planar. Contraction of the raised region 108 during cooling from the HPHT process used to form or bond the PCD table 102 induces higher compressive stresses in the PCD table 102 at and near the raised region 108 than would occur if the interfacial surface 106 was planar. Consequently, after leaching to form the leached second region 122, the residual radial compressive stresses in the PCD table 102 at and near the raised region 108 are retained at a sufficient damage tolerant level. In some embodiments, the residual radial compressive stresses in the PCD table 102 may be at a level comparable to or may be approximately equal to the residual radial compressive stress that would be present in the PCD table 102 if the interfacial surface 106 was generally planar and the PCD table 102 was un-leached.

Figure 2A:
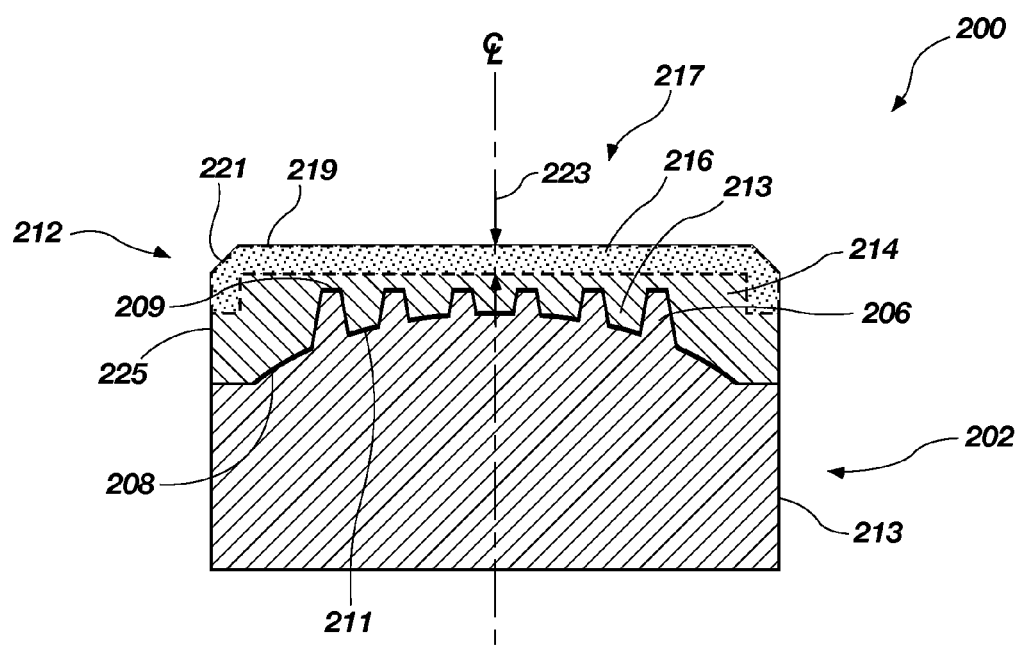
FIG. 2A is a cross-sectional view of another embodiment of a PDC comprising a substrate including an interfacial surface having a raised region and a leached PCD table.
Figure 2B:
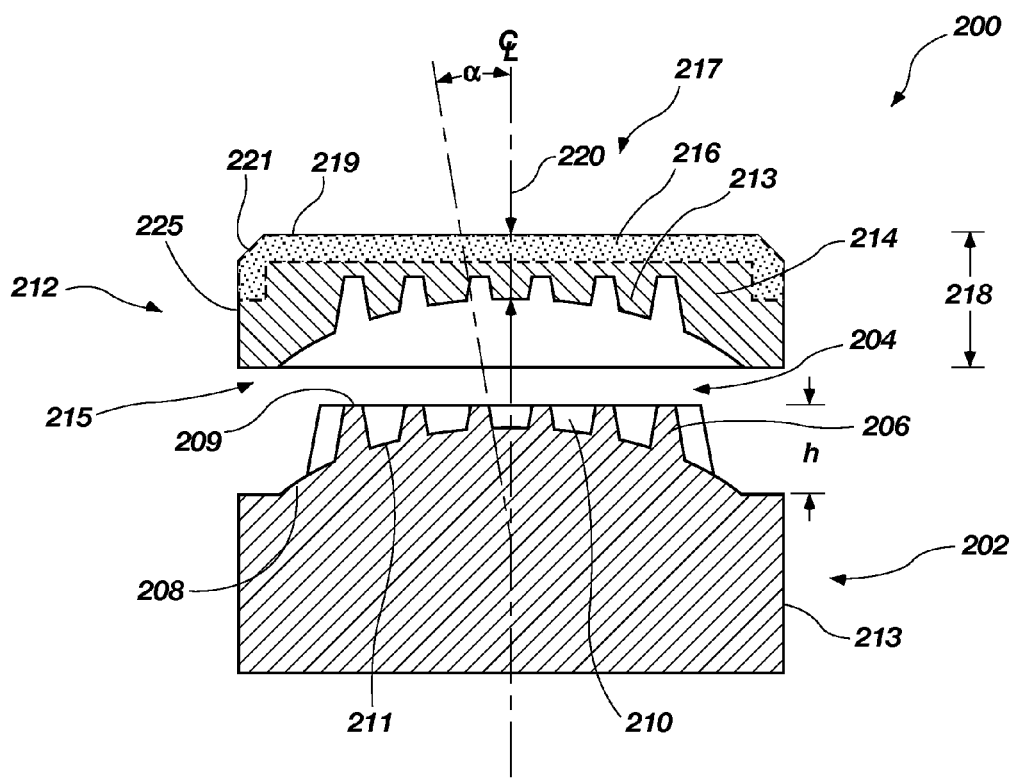
FIG. 2B is an exploded cross-sectional view of the PDC shown in FIG. 2A.
Figure 2C:
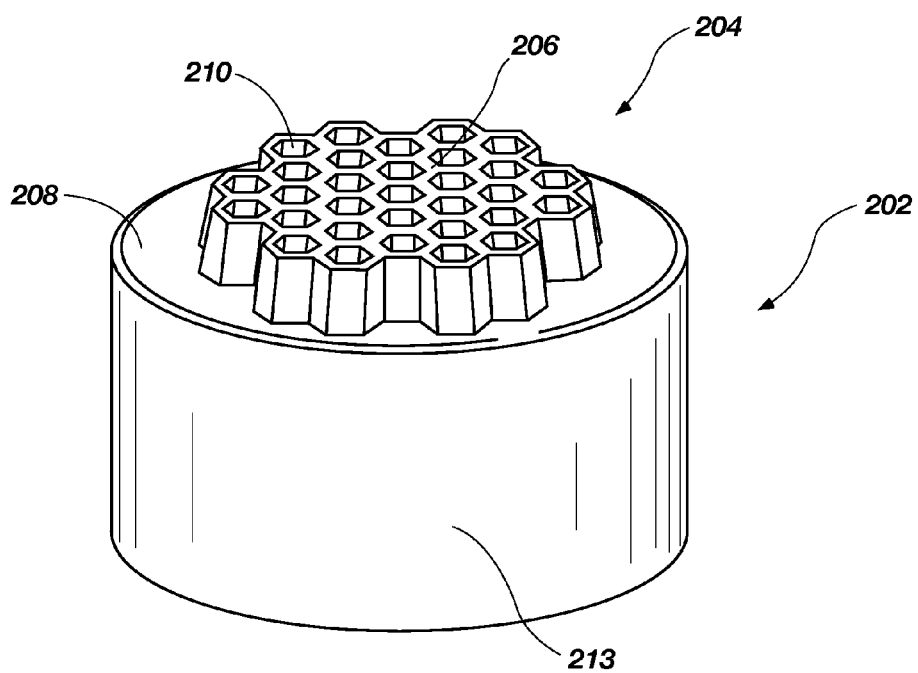
FIG. 2C is a top isometric view of the substrate of the PDC shown in FIGS. 2A and 2B.

FIGS. 2A and 2B are cross-sectional and exploded cross-sectional views, respectively, of a PDC 200 comprising a substrate 202 including an interfacial surface 204 exhibiting a raised region according to another embodiment. FIG. 2C is a top isometric view of the substrate 202. The substrate 202 may be made from the same carbide materials as the substrate 104 shown in FIGS. 1A-1C. The interfacial surface 204 of the substrate 202 includes a plurality of hexagonal protrusions 206 that extend outwardly from a face 208 to define a raised region. The face 208 may be convex, as in the illustrated embodiment, or substantially planar. Optionally, tops 209 of the protrusions 206 may lie generally in a common plane. The tops 209 of the protrusions 206 may extend above the lower most portion of the interfacial surface 204 a distance "h." For example, the distance "h" may be about 500 µm to about 2540 µm, about 760 µm to about 1900 µm, or about 1140 µm to about 1520 µm. The plurality of protrusions 206 defines a plurality of internal cavities 210 (see FIG. 2B). Optionally, a depth of each internal cavity 210 may decrease as they approach the center of the substrate 202. A bottom 211 of each cavity 210 may follow the profile of the face 208.

The PDC 200 further includes a PCD table 212 bonded to the interfacial surface 204 of the substrate 202. The PCD table 212 includes an interfacial surface 215 that may be configured to correspond to the topography of the interfacial surface 204 of the substrate 202. For example, protrusions 213 of the PCD table 212 may fill each internal cavity 210 defined by the protrusions 206 of the substrate 202. The closed features of the hexagonal protrusions 206 include a draft angle α, such as about 5 degrees to about 15 degrees. The PCD table 212 further includes an upper surface 217 having a major upper surface 219, at least one peripheral surface 225, and a peripherally-extending chamfer 221 extending therebetween.

The PCD table 212 includes a first region 214 extending inwardly from the interfacial surface 215 (see FIG. 2B) in which the interstitial regions have metal-solvent catalyst disposed therein that was infiltrated from the substrate 202. The PCD table 212 also includes a leached second region 216 extending inwardly from the major upper surface 219 and chamfer 221 in which the interstitial regions have been depleted of metal-solvent catalyst. Generally, a maximum leach depth 223 (see FIG. 2A) may be greater than 250 µm. For example, the maximum leach depth 223 for the leached second region 216 may be greater than 300 µm to about 425 µm, greater than 350 µm to about 400 µm, greater than 350 µm to about 375 µm, about 375 µm to about 400 µm, or about 500 µm to about 650 µm. The maximum leach depth 223 may be measured inwardly from at least one of the major upper surface 219, the peripheral surface 225, or the chamfer 221.

The PCD table 212 exhibits a maximum thickness 218 (see FIG. 2B) over a peripheral region of the face 208 and a thickness 220 (see FIG. 2B) over the hexagonal protrusions 206 of the substrate 204 proximate to a centerline of the PDC 200. In the illustrated embodiment, the thickness 220 is a minimum thickness of the PCD table 212 over the hexagonal protrusions 206. However, the thickness 220 may be used to represent any cross-sectional thickness of the PCD table 212. The thickness 220 of the PCD table 212 may be about 1900 μm or less, about 500 μm to about 1500 μm, about 500 μm to about 1000 μm, about 500 μm to about 800 μm, or about 750 μm to about 950 μm. The maximum thickness 218 of the PCD table 212 in the peripheral region may be about 1.5 to about 3 times greater than the thickness 220 of the PCD table 212 over the hexagonal protrusions 206. For example, the maximum thickness 218 may be about 1125 μm to about 5700 μm, about 2285 μm to about 3000 μm, or about 2285 μm to about 3500 μm. A ratio of the thickness 220 of the PCD table 212 to the maximum leach depth 223 may be about 1.25 to about 8.0, about 1.25 to about 6.5, about 1.25 to about 4.0, or about 2.0 to about 5.0.

The thickness of the PCD table 212 gradually increases as with distance toward a perimeter 213 of the PDC 200. After leaching to form the leached second region 216, the combination of the raised protrusions 206 and the reduced cross-sectional thickness of the PCD table 212 over the protrusions 206 results in a sufficient level of radial compressive residual stresses being retained even after leaching.

The PCD table 212 may be configured to correspond to the topography of the interfacial surface 204 of the substrate 202. For example, protrusions 213 of the PCD table 212 may fill each internal cavity 210 defined by the protrusions 206 of the substrate 202. The closed features of the hexagonal protrusions 206 include a draft angle α, such as about 5 degrees to about 15 degrees.

In some embodiments, the ratio of the maximum distance "h" to the maximum thickness 218 of the PCD table 212 is greater than or equal to 0.2. For example, the ratio of the maximum distance "h" to the maximum thickness 218 of the PCD table 212 may be about 0.2 to about 0.5, about 0.4 to about 0.5, about 0.45 to about 0.55, about 0.52 to about 0.58.

In some embodiments, the ratio of the volume of the hexagonal protrusions 206 to the volume of the PCD table 212 is greater than or equal to 0.15. For example, the ratio of the volume of the hexagonal protrusions 206 to the volume of the PCD table 212 may be about 0.15 to about 0.50, about 0.20 to about 0.30, about 0.25 to about 0.45, or about 0.35 to about 0.50.

In some embodiments, the surface area of the hexagonal protrusions 206 and the bottoms 211 of the hexagonal protrusions 206 may be about 60% or more of the surface area of the interfacial surface 204. For example, the surface area of the hexagonal protrusions 206 and the bottoms 211 of the hexagonal protrusions 206 may be about 60% to about 85%, about 65% to about 75%, or about 70% to about 75% of the surface area of the interfacial surface 204.

It is noted that embodiments for the PDC 200 may exhibit any suitable combination of aforementioned characteristics. For example, the PDC 200 may exhibit any suitable combination of the disclosed thicknesses and/or thickness ranges for the thickness 220, maximum thicknesses and/or thickness ranges for the maximum thickness 218, ratios and/or ratio ranges for the ratio of the thickness 220 to the maximum leach depth 223, ratios or ratio ranges for the ratio of the distance "h" to the maximum thickness 218 of the PCD table 212, ratios or ratio ranges for the ratio of volume of the hexagonal protrusions 206 to the volume of the PCD table 212, and the surface area of the hexagonal protrusions 206 and the bottoms 211 relative to the surface area of the interfacial surface 204.

Figure 3A:
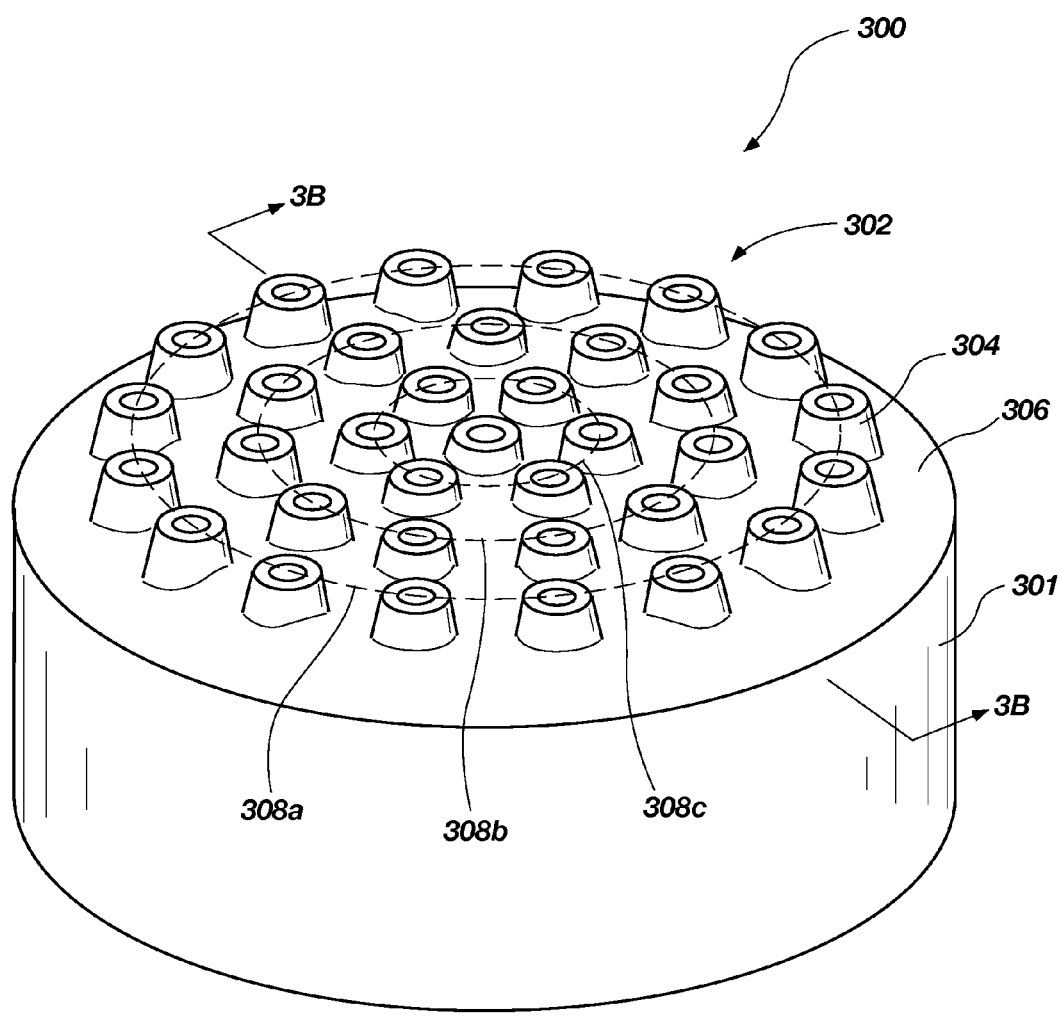
FIG. 3A is an isometric view of a substrate exhibiting an interfacial surface geometry according to yet another embodiment.
Figure 3B:
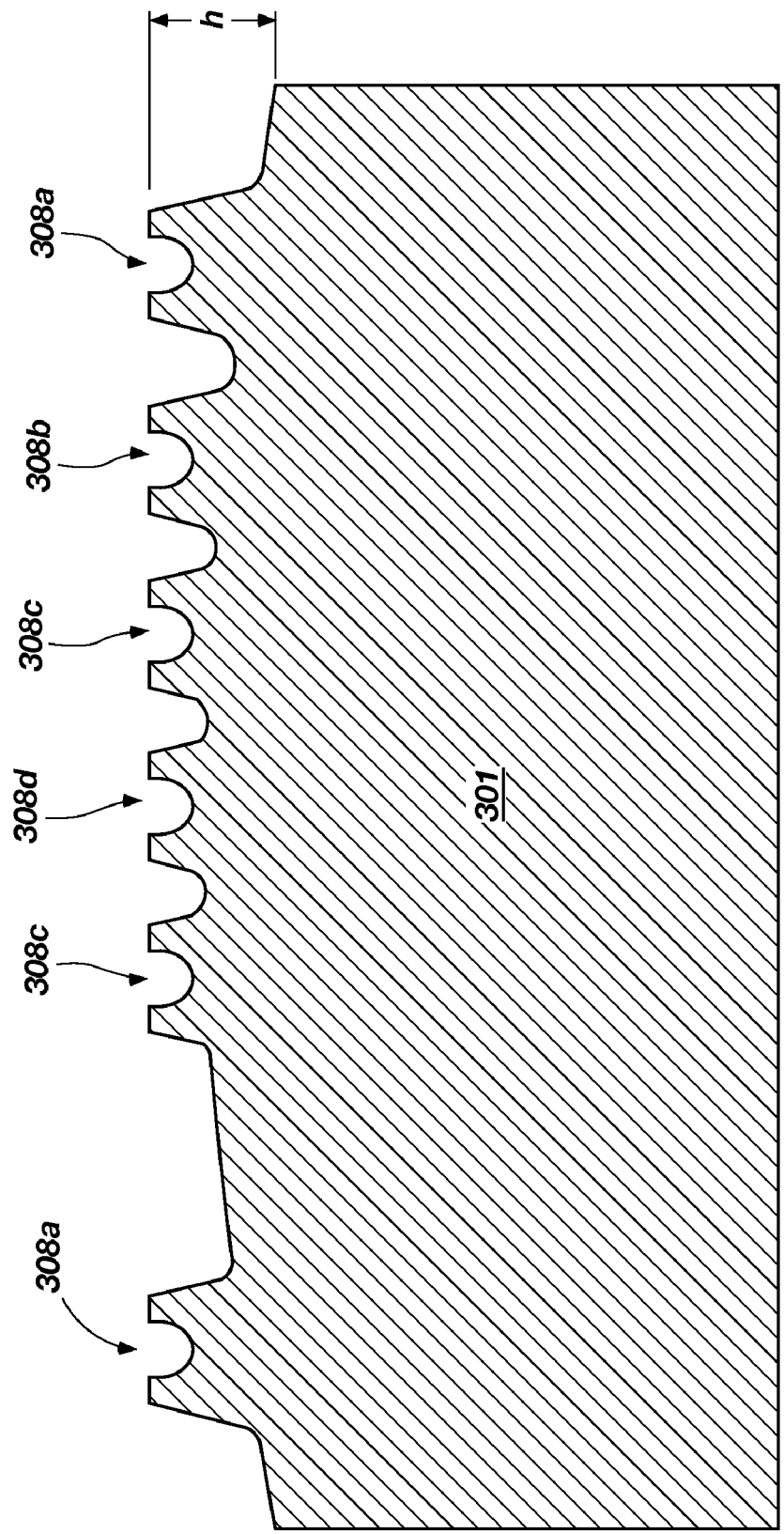
FIG. 3B is a cross-sectional view of the substrate shown in FIG. 3A taken along line 3B-3B thereof.

FIGS. 3A and 3B are isometric and cross-sectional views, respectively, of a substrate 300 exhibiting a substrate configuration according to yet another embodiment. The substrate 300 includes a substrate body 301 including an interfacial surface 302. The interfacial surface 302 includes a plurality of projections 304 that extend outwardly from a face 306. The face 306 may be planar or convex. The projections 304 are arranged in a plurality of spaced, concentric generally circular patterns. For example, in the illustrated embodiment, the projections 304 are arranged into circumferentially-distributed sets 308a-308c of the projections 304 that are radially spaced from each other, with a single projection 304 encircled by the set 308c. The number of the projections 304 is progressively less in each set 308a-308c with radial distance inward from the set 308a. Optionally, as shown in the illustrated embodiments, the projections 304 each extend to a distance "h" above the face 306 so that they are generally coplanar with each other. For example, the distance "h" may be about 500 μm to about 2540 μm, 760 μm to about 1900 μm, or about 1140 μm to about 1520 μm. However, in other embodiments, the respective tops 309 of the projections 304 may extend to different distances above the face 306.

Figure 4A:
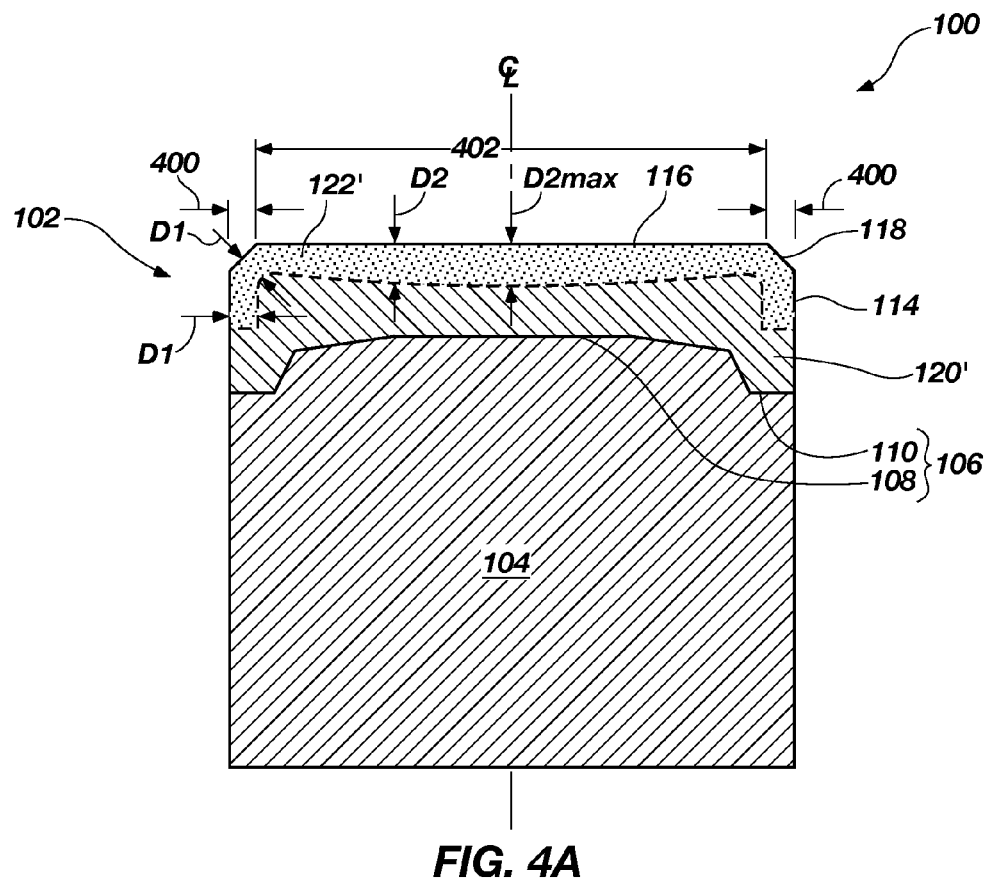
FIG. 4A is a cross-sectional view of the PDC shown in FIGS. 1A-1C illustrating the non-uniformity of the leach depth profile as a function of radial distance according to an embodiment.
Figure 4B:
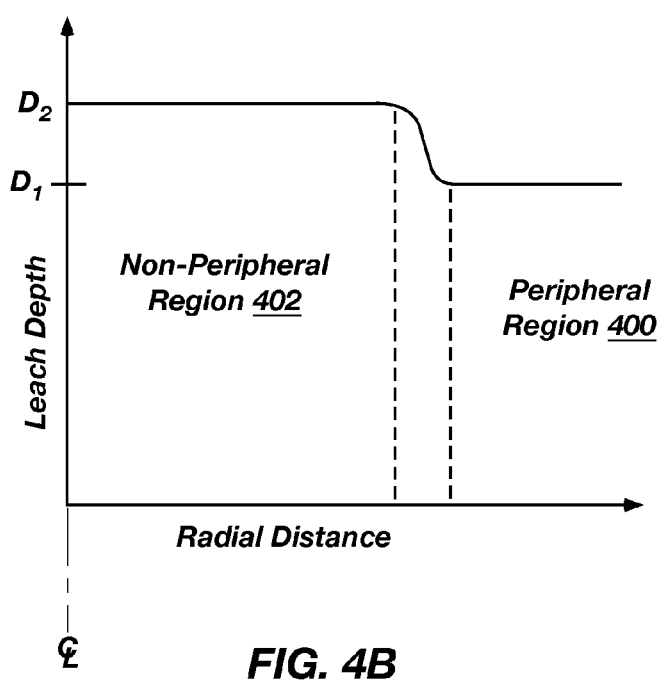
FIG. 4B is a graph of an embodiment of a non-uniform leach depth profile for the PDC shown in FIG. 1A as a function of radial distance.

Depending on the manner in which the PDC 100 or 200 is manufactured, the PCD table 102 or 212 may exhibit a non-uniform leach depth profile. For example, FIG. 4A is a cross-sectional view of the PDC 100 in which the PCD table 102 thereof exhibits a non-uniform leach depth profile and FIG. 4B is a graph of an embodiment of a non-uniform leach depth profile for the PCD table 102 as a function of radial distance. The leach depth varies with radial distance from the centerline of the PDC 100 and toward the peripheral surface 114 of the PCD table 102.

The leached second region 122 is labeled as leached second region 122' and first region 120 is labeled as first region 120' in order to highlight that the geometry is different than the leached second region 122 and the first region 120 shown in FIG. 1C. The leached second region 122' includes a peripheral region 400 that extends inwardly from the chamfer 118 and the peripheral surface 114. The peripheral region 400 extends about a non-peripheral region 402 that extends inwardly from the major surface 116. For example, the non-peripheral region 402 may be generally centrally located in the PCD table 102, with the peripheral region 400 extending thereabout.

The leach depth in the peripheral region 400 is indicated by D1 and measured inwardly from the chamfer 118 and/or the peripheral surface 114. The leach depth in the non-peripheral region 402 is indicated by D2 and measured inwardly from the major surface 116. The maximum leach depth for the leach depth D1 in the peripheral region 400 may be about 5 percent to about 60 percent, about 5 percent to about 50 percent, about 25 percent to about 50 percent, about 5 percent to about 15 percent, or about 8 percent to about 12 percent less than the maximum leach depth $D2_{max}$ for the leach depth D2 in the non-peripheral region 402. The maximum leach depth $D2_{max}$ for the leach depth D2 in the non-peripheral region 400 may be, in some embodiments, generally centrally located as illustrated. The shallower leach depth D1 and higher metal-solvent catalyst content in the peripheral region 400 may provide a more impact-resistant edge region for the PCD table 102, while still also providing sufficient thermal stability. The non-peripheral region 402 extends along substantially all of or a majority of the major surface 116. For example, the major surface 116 that partially defines the non-peripheral region may function predominately as the working surface when cutting a subterranean formation, and benefits from the deeper average leach depth D2 in the non-peripheral region 402 that imparts enhanced thermal stability to the non-peripheral region 402 relative to the peripheral region 400.

While the leach depth profile illustrated in FIG. 4A is substantially symmetric about the centerline of the PDC 100 or a plane of symmetry of the PDC 100 that includes the centerline, the leach depth profile may be asymmetric about the centerline in other embodiments. Generally, a maximum leach depth of the leach depth profile may be greater than 250 μm. For example, the maximum leach depth for the leach depth D1 on one side of the centerline or the plane of symmetry may be about 5 to about 15 percent less than a maximum leach depth for the leach depth D1 on the other side of the central axis 122.

Although the leach depth D2 is illustrated as decreasing gradually with radial distance from the centerline in FIG. 4A, in other embodiments, the leach depth D2 may vary more rapidly. For example, the leach depth D2 may decrease more rapidly with radial distance from the centerline proximate to the peripheral region 400 of the leached second region 122' than in the illustrated embodiment shown in FIG. 4A.

In an embodiment, prior to forming the leached second region 122', the chamfer 118 may be formed using an abrasive grinding process (e.g., grinding via a diamond-resin-bonded abrasive wheel) and the major surface 116 may be planarized using a relatively less aggressive material removal process, such as lapping in a diamond slurry. The peripheral surface 114 may be defined using a centerless abrasive grinding process or other suitable grinding process. The abrasive grinding process used to form the chamfer 118 and grind the peripheral surface 114 may tend to fracture some of the diamond grains and/or the abrasive wheel and embed the fractured material in the metal-solvent catalyst. The less aggressive lapping process that may be used to form the major surface 116 does not tend to fracture the diamond grains and/or the abrasive wheel. It is currently believed by the inventors that the fractured material embedded in the metal-solvent catalyst may inhibit removal of the metal-solvent catalyst in the peripheral region 400 compared to the non-peripheral region 402 so that the maximum and/or average leach depth D1 of the peripheral region 400 is less than that of the maximum and/or average leach depth D2 in the non-peripheral region 402.

It is also currently believed by the inventors that as pressure employed in the HPHT process used to fabricate the PCD table 102 and/or the PDC 100 increases to about 7.5 GPa or more, the volume of diamond present in the peripheral region 400 of the PCD table 102 may be greater than the volume of diamond in the non-peripheral region 402. In addition to or as an alternative to the fractured material inhibiting removal of the metal-solvent catalyst from the peripheral region 400 of the PCD table 102, this increased diamond volume in the peripheral region 400 may contribute to the non-uniformity of the leach depth profile of the leached second region 122' of the PCD table 102.

In some embodiments, the maximum and/or average leach depth D1 of a side section of the peripheral region 400 that extends inwardly from the peripheral surface 114 may be greater than the maximum and/or average leach depth D1 of a chamfer section of the peripheral region 400 that extends inwardly from the chamfer 118. For example, the maximum and/or average leach depth D1 of the side section may be about 2 percent to about 5 percent greater than the maximum and/or average leached depth D1 of the chamfer section, respectively. The maximum and/or average leach depth D1 of the side section may increase when the grinding process used to define the peripheral surface 114 is substantially less aggressive than the grinding process used to form the chamfer 118.

In the illustrated embodiments shown in FIGS. 1A-3B, the PDCs are cylindrical. For example, with reference to FIG. 4A, the peripheral region 400 of the leached second region 122' may exhibit a generally ring-shaped geometry, while the non-peripheral region 402 exhibits a generally disk-shaped geometry. However, in other embodiments, the PDCs disclosed herein may exhibit other suitable configurations (e.g., triangular, rectangular, elliptical, or other suitable configuration) that may exhibit one or more peripheral surfaces or sides.

In some embodiments, the interstitial regions of the leached second regions 122, 122', or 216 of the PDCs 100 and 200 may be infiltrated with a replacement material in a second HPHT process. For example, incorporating a replacement material into the leached second regions 122, 122', or 216 may increase abrasion resistance without substantially compromising thermal stability. For example, the replacement material may comprise a nonmetallic diamond catalyst selected from a carbonate (e.g., one or more carbonates of Li, Na, K, Be, Mg, Ca, Sr, and Ba), a sulfate (e.g., one or more sulfates of Be, Mg, Ca, Sr, and Ba), a hydroxide (e.g., one or more hydroxides of Be, Mg, Ca, Sr, and Ba), elemental phosphorous and/or a derivative thereof, a chloride (e.g., one or more chlorides of Li, Na, and K), elemental sulfur, a polycyclic aromatic hydrocarbon (e.g., naphthalene, anthracene, pentacene, perylene, coronene, or combinations of the foregoing) and/or a derivative thereof, a chlorinated hydrocarbon and/or a derivative thereof, a semiconductor material (e.g., germanium or a geranium alloy), and combinations of the foregoing. For example, one suitable carbonate material is an alkali metal carbonate material including a mixture of sodium carbonate, lithium carbonate, and potassium carbonate that form a low-melting ternary eutectic system. This mixture and other suitable alkali metal carbonate materials are disclosed in U.S. patent application Ser. No. 12/185,457, which is incorporated herein, in its entirety, by this reference. The infiltrated alkali metal carbonate material disposed in the interstitial regions of the leached second region may be partially or substantially completely converted to one or more corresponding alkali metal oxides by suitable heat treatment following infiltration.

In another embodiment, the replacement material may comprise a material that is relatively noncatalytic with respect to diamond, such as silicon or a silicon-cobalt alloy. The silicon or a silicon-cobalt alloy may at least partially react with the diamond grains of the leached second region so that it comprises silicon carbide, cobalt carbide, a mixed carbide of cobalt and silicon, or combinations of the foregoing and may also include silicon and/or a silicon-cobalt alloy (e.g., cobalt silicide). For example, silicon carbide, cobalt carbide, and a mixed carbide of cobalt and silicon are reaction products that may be formed by the replacement material reacting with the diamond grains of the leached second region.

Figure 5A:
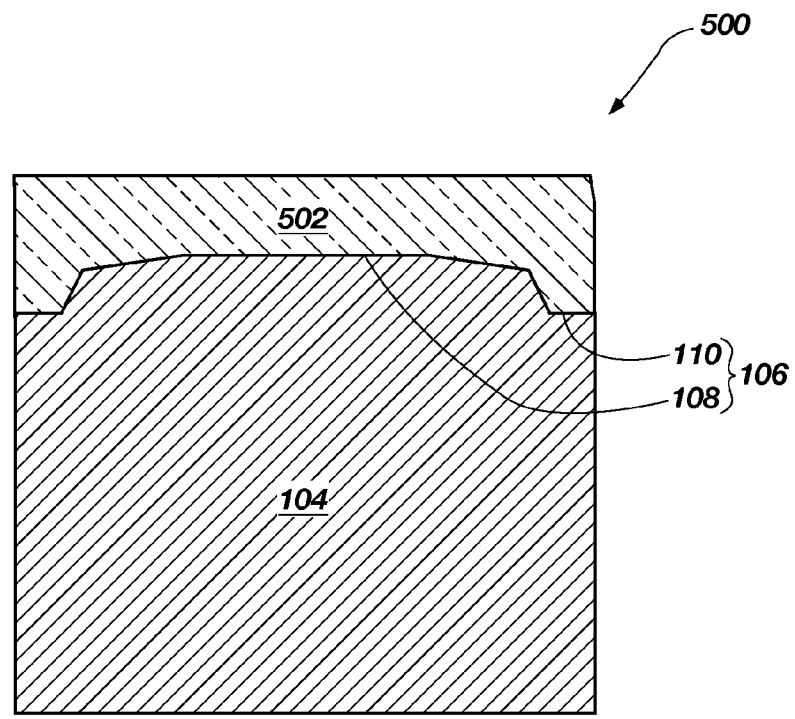
FIGS. 5A-5C are cross-sectional views at different stages during the fabrication of the PDC shown in FIGS. 1A-1C according to an embodiment of a method.
Figure 5B:
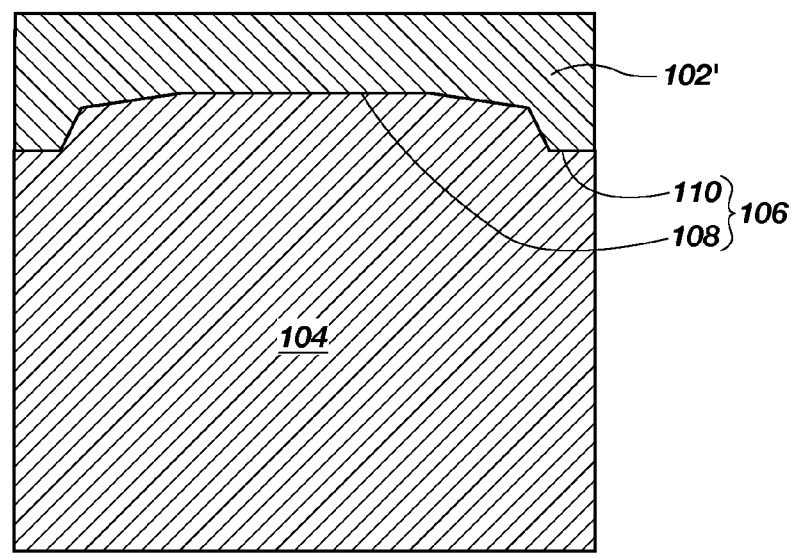
Figure 5C:
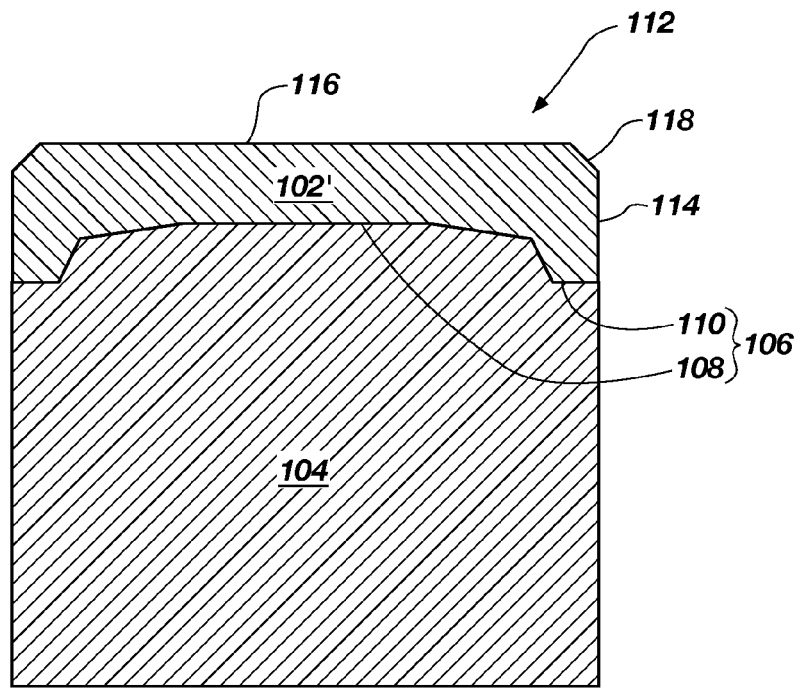

FIGS. 5A-5C are cross-sectional views at different stages during the fabrication of the PDC 100 shown in FIGS. 1A-1C according to an embodiment of a method. Referring to FIG. 5A, an assembly 500 may be formed by disposing one or more layers 502 of diamond particles adjacent to the interfacial surface 106 of the substrate 104. The plurality of diamond particles of the one or more layers 502 of diamond particles may exhibit one or more selected sizes. The one or more selected sizes may be determined, for example, by passing the diamond particles through one or more sizing sieves or by any other method. In an embodiment, the plurality of diamond particles may include a relatively larger size and at least one relatively smaller size. As used herein, the phrases "relatively larger" and "relatively smaller" refer to particle sizes determined by any suitable method, which differ by at least a factor of two (e.g., 40 µm and 20 µm). In various embodiments, the plurality of diamond particles may include a portion exhibiting a relatively larger size (e.g., 100 µm, 90 µm, 80 µm, 70 µm, 60 µm, 50 µm, 40 µm, 30 µm, 20 µm, 15 µm, 12 µm, 10 µm, 8 µm) and another portion exhibiting at least one relatively smaller size (e.g., 30 µm, 20 µm, 10 µm, 15 µm, 12 µm, 10 µm, 8 µm, 4 µm, 2 µm, 1 µm, 0.5 µm, less than 0.5 µm, 0.1 µm, less than 0.1 µm). In an embodiment, the plurality of diamond particles may include a portion exhibiting a relatively larger size between about 40 µm and about 15 µm and another portion exhibiting a relatively smaller size between about 12 µm and 2 µm. Of course, the plurality of diamond particles may also include three or more different sizes (e.g., one relatively larger size and two or more relatively smaller sizes), without limitation.

In some embodiments, non-diamond carbon, such as graphite particles, fullerenes, other non-diamond carbon, or combinations of the foregoing may be mixed with the plurality of diamond particles. The non-diamond carbon substantially converts to diamond during the HPHT fabrication process discussed in more detail below. The presence of the non-diamond carbon during the fabrication of the PCD table 102 is believed to enhance the diamond density of the PCD table 102 so formed and also result in relative greater non-uniformity in the leach depth profile of, for example, the leached second region 122' shown in FIG. 4A. The non-diamond carbon may be selected to be present in a mixture with the plurality of diamond particles in an amount of about 0.1 wt % to about 20 wt %, such as about 0.1 wt % to about 10 wt %, about 1 wt % to about 9 wt %, about 2 wt % to about 9 wt %, about 3 wt % to about 6 wt %, about 4.5 wt % to about 5.5 wt %, about 5 wt %, about 0.1 wt % to about 0.8 wt %, or about 0.1 wt % to about 0.50 wt %.

The graphite particles employed for the non-diamond carbon may exhibit an average particle size of about 1 µm to about 5 µm (e.g., about 1 µm to about 3 µm) so that the graphite particles may fit into interstitial regions defined by the plurality of diamond particles. According to various embodiments, the graphite particles may be crystalline graphite particles, amorphous graphite particles, synthetic graphite particles, or combinations thereof. The term "amorphous graphite" refers to naturally occurring microcrystalline graphite. Crystalline graphite particles may be naturally occurring or synthetic. Various types of graphite particles are commercially available from Ashbury Graphite Mills of Kittanning, Pa.

The assembly 500 including the substrate 104 and the one or more layers 502 of diamond particles may be placed in a pressure transmitting medium, such as a refractory metal can embedded in pyrophyllite or other pressure transmitting medium. The pressure transmitting medium, including the assembly 500 enclosed therein, may be subjected to an HPHT process using an ultra-high pressure press to create temperature and pressure conditions at which diamond is stable. The temperature of the HPHT process may be at least about 1000° C. (e.g., about 1200° C. to about 1600° C.) and the pressure of the HPHT process may be at least 4.0 GPa (e.g., about 5.0 GPa to about 12 GPa or about 7.5 GPa to about 11 GPa) for a time sufficient to sinter the diamond particles to form a PCD table 102' that is shown in FIG. 5B. For example, the pressure of the HPHT process may be about 8 GPa to about 10 GPa and the temperature of the HPHT process may be about 1150° C. to about 1450° C. (e.g., about 1200° C. to about 1400° C.). Upon cooling from the HPHT process, the PCD table 102' becomes bonded (e.g., metallurgically) to the substrate 104. The foregoing pressure values employed in the HPHT process refer to the pressure in the pressure transmitting medium that transfers the pressure from the ultra-high pressure press to the assembly 300.

During the HPHT process, metal-solvent catalyst from the substrate 104 may be liquefied and may infiltrate into the diamond particles of the one or more layers 502 of diamond particles. The infiltrated metal-solvent catalyst functions as a catalyst that catalyzes formation of directly bonded-together diamond grains from the diamond particles to form the PCD table 102'. The PCD table 102' is comprised of a plurality of directly bonded-together diamond grains, with the infiltrated metal-solvent catalyst disposed interstitially between the bonded diamond grains.

Referring to FIG. 5C, the PCD table 102' may be subjected to a planarization process, such as lapping, to planarize an upper surface of the PCD table 102' and form the major surface 116. A grinding process may be used to form the chamfer 118 in the PCD table 102' before or after the planarization process. The peripheral surface 114 may be defined by grinding the PCD table 102' using a centerless abrasive grinding process or other suitable process before or after the planarization process and/or forming the chamfer 118. After forming the major surface 116 and the chamfer 118, the PCD table 102' may be leached in a suitable acid to form the leached second region 122 (FIG. 1C), while the un-leached region of the PCD table 102' is represented as the first region 120 in FIG. 1C. For example, the acid may be aqua regia, nitric acid, hydrofluoric acid, or combinations thereof. The inventors currently believe that as the aggressiveness of the grinding process to form the chamfer 118 and/or the pressure of the HPHT process to form the PCD table 102' increases, the leach depth profile may become progressively more non-uniform.

Figure 6A:
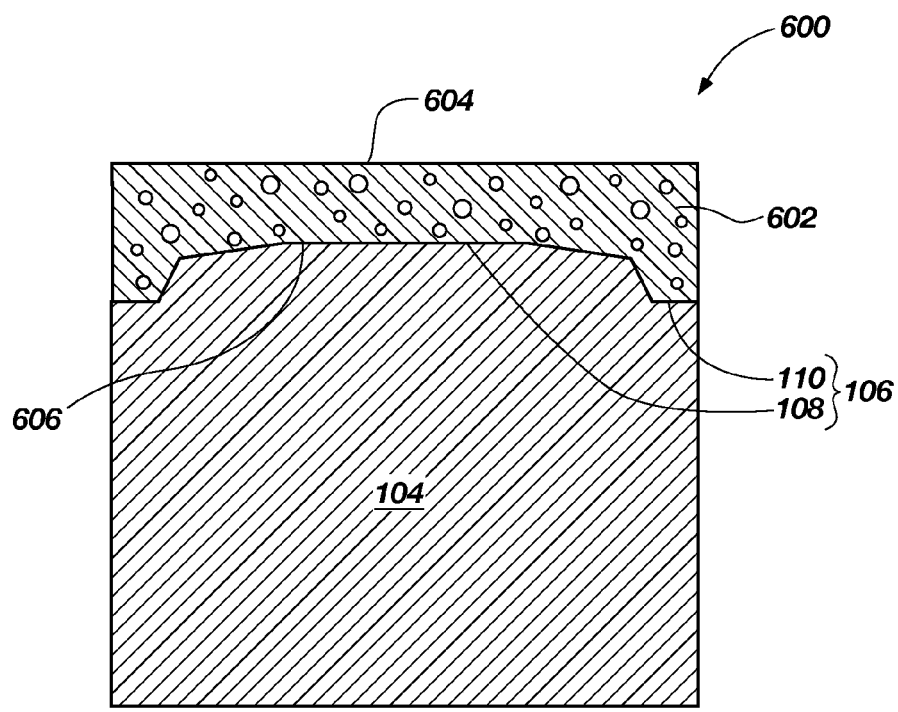
FIGS. 6A-6C are cross-sectional views at different stages during the fabrication of the PDC shown in FIGS. 1A-1C according to another embodiment of a method.
Figure 6B:
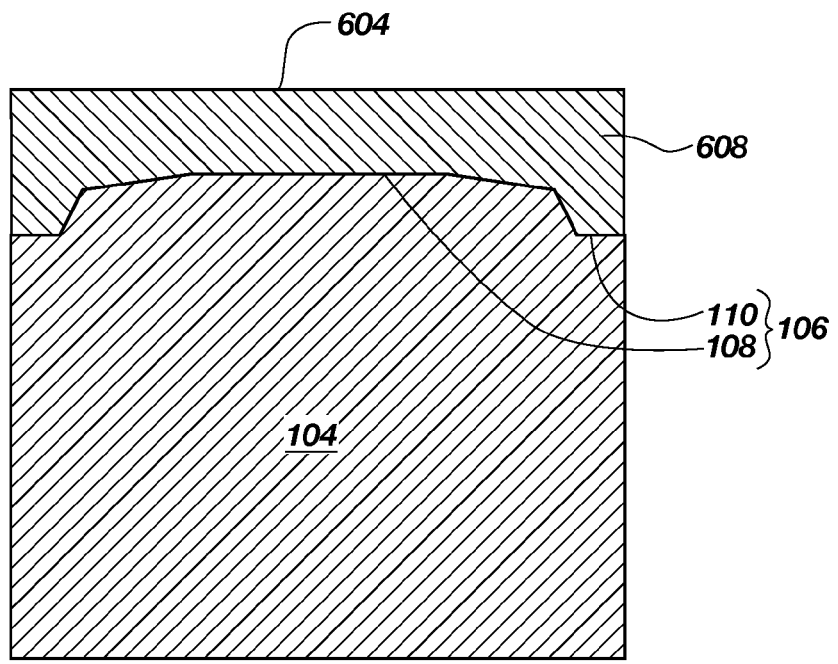
Figure 6C:
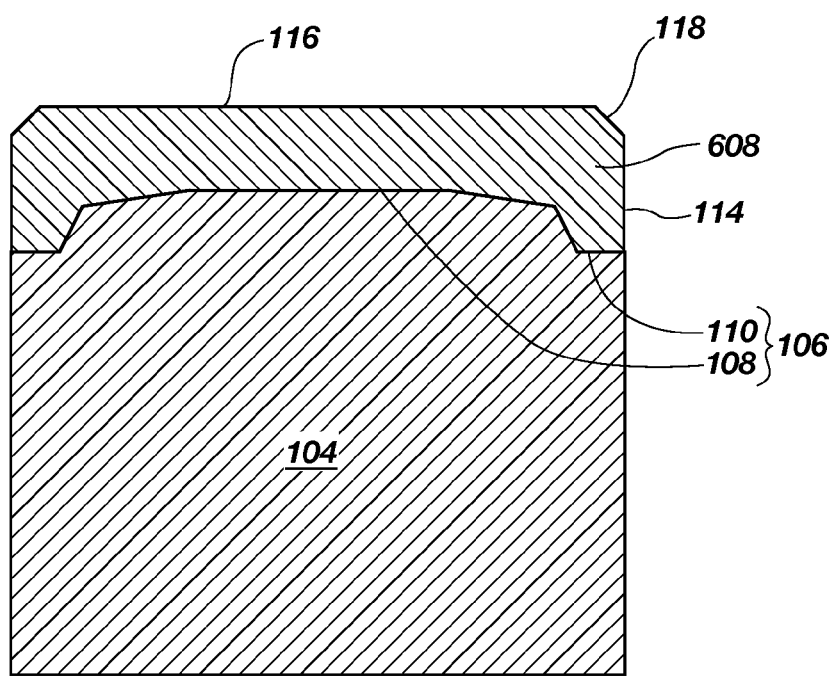

FIGS. 6A-6C are cross-sectional views at different stages during the fabrication of the PDC 100 shown in FIGS. 1A-1C according to an embodiment of a method for fabricating the PDC 100 that employs a pre-sintered PCD table. Referring to FIG. 6A, an assembly 600 is formed by disposing an at least partially leached PCD table 602 adjacent to the interfacial surface 106 of the substrate 104. The at least partially leached PCD table 602 includes an upper surface 604 and an opposing interfacial surface 606 positioned adjacent to the interfacial surface 106 of the substrate 104. The interfacial surface 606 of the at least partially leached PCD table 602 is configured to correspond to the geometry of the interfacial surface 106 of the substrate 104. The at least partially leached PCD table 602 includes a plurality of directly bonded-together diamond grains defining interstitial regions that form a network of at least partially interconnected pores, which enables fluid to flow from the substrate interfacial surface 606 to the upper surface 604.

The at least partially leached PCD table 602 may be formed by HPHT sintering a plurality of diamond particles (e.g., with or without a substrate) exhibiting any of the disclosed particle size distributions in the presence of a metal-solvent catalyst, and removing at least a portion of or substantially all the metal-solvent catalyst from sintered PCD body by leaching. The HPHT sintering may be performed using any of the disclosed HPHT process conditions. In some embodiments, any of the disclosed non-diamond carbon materials may be mixed with the plurality of diamond particles in any of the disclosed amounts. For example, the metal-solvent catalyst may be infiltrated into the diamond particles from a metal-solvent catalyst disc (e.g., a cobalt disc), mixed with the diamond particles, infiltrated from a cemented carbide substrate, or combinations of the foregoing. The metal-solvent catalyst may be at least partially removed from the sintered PCD body by immersing the sintered PCD body in an acid, such as aqua regia, nitric acid, hydrofluoric acid, or other suitable acid. For example, the sintered PCD body may be immersed in the acid for about 2 to about 7 days (e.g., about 3, 5, or 7 days) or for a few weeks (e.g., about 4 weeks) depending on the process employed to form the at least partially leached PCD table 602.

The assembly 600 may be placed in a pressure transmitting medium, such as a refractory metal can embedded in pyrophyllite or other pressure transmitting medium. The pressure transmitting medium, including the assembly 600 enclosed therein, may be subjected to an HPHT process using an ultra-high pressure press using any of the disclosed HPHT process conditions so that metal-solvent catalyst from the substrate 104 is liquefied and infiltrates into the interstitial regions of the at least partially leached PCD table 602. For example, the pressure of the HPHT process may be about 5 GPa to about 7 GPa and the temperature of the HPHT process may be about 1150° C. to about 1450° C. (e.g., about 1200° C. to about 1400° C.). Upon cooling from the HPHT process, the infiltrated PCD table represented as PCD table 608 in FIG. 6B becomes bonded to the substrate 104.

Referring to FIG. 6C, the upper surface 604 of the PCD table 608 may be subjected to a planarization process, such as lapping, to form the major surface 116. A grinding process may be used to form the chamfer 118 in the PCD table 608 before or after the planarization process. The peripheral surface 114 may be defined in the PCD table 608 using a centerless abrasive grinding process or other suitable process before or after the planarization process and/or forming the chamfer 118. After forming the major surface 116 and the chamfer 118, the PCD table 608 may be leached in a suitable acid to form the leached second region 122 (FIG. 1C), while the un-leached region of the PCD table 608 is represented as the first region 120 in FIG. 1C. Again, the inventors currently believe that as the aggressiveness of the grinding process used to form the chamfer 118 and/or the pressure of the HPHT process used to form the PCD table 102' increases, the leach depth profile may become progressively more non-uniform.

It is noted that although the substrate 104 having the raised region 108 with a polygonal cross-sectional geometry is shown in FIGS. 5A-6C, other substrate geometries may be used. For example, the substrate 202, the substrate 400 or other suitable substrate geometry may be used.

Regardless of whether the PCD table is integrally formed with the substrate or separately formed and bonded to the substrate in a separate HPHT process, a replacement material may be infiltrated into interstitial regions of the leached second region in a second HPHT process. For example, the replacement material may be disposed adjacent to the upper surface 116 and/or the peripheral surface 114, and infiltrate the interstitial regions of the leached second region 122 or 122' during the second HPHT process. According to various embodiments, the replacement material may be selected from a carbonate (e.g., one or more carbonates of Li, Na, K, Be, Mg, Ca, Sr, and Ba), a sulfate (e.g., one or more sulfates of Be, Mg, Ca, Sr, and Ba), a hydroxide (e.g., one or more hydroxides of Be, Mg, Ca, Sr, and Ba), elemental phosphorous and/or a derivative thereof, a chloride (e.g., one or more chlorides of Li, Na, and K), elemental sulfur, a polycyclic aromatic hydrocarbon (e.g., naphthalene, anthracene, pentacene, perylene, coronene, or combinations of the foregoing) and/or a derivative thereof, a chlorinated hydrocarbon and/or a derivative thereof, a semiconductor material (e.g., germanium or a geranium alloy), and combinations of the foregoing. For example, one suitable carbonate material is an alkali metal carbonate material including a mixture of sodium carbonate, lithium carbonate, and potassium carbonate that form a low-melting ternary eutectic system. This mixture and other suitable alkali metal carbonate materials are disclosed in the aforementioned U.S. patent application Ser. No. 12/185,457. The infiltrated alkali metal carbonate material disposed in the interstitial regions of the leached second region 122 may be partially or substantially completely converted to one or more corresponding alkali metal oxides by suitable heat treatment following infiltration.

In another embodiment, the replacement material may comprise silicon or a silicon-cobalt alloy. The replacement material may at least partially react with the diamond grains of the leached second region 122 or 122' to form silicon carbide, cobalt carbide, a mixed carbide of cobalt and silicon, or combinations of the foregoing, while unreacted amounts of the replacement material may also remain and include silicon and/or a silicon-cobalt alloy (e.g., cobalt silicide). For example, silicon carbide, cobalt carbide, and a mixed carbide of cobalt and silicon are reaction products that may be formed by the replacement material reacting with the diamond grains of the leached second region 122 or 122'. In an embodiment, the silicon-cobalt replacement material may be present in a layer placed adjacent to the upper surface 116, which includes silicon particles present in an amount of about 50 to about 60 wt % and cobalt particles present in an amount of about 40 to about 50 wt %. In a more specific embodiment, the layer includes silicon particles and cobalt particles present in an amount of about equal to or near a eutectic composition of the silicon-cobalt chemical system. In some embodiments, the silicon particles and cobalt particles may be held together by an organic binder to form a green layer of cobalt and silicon particles. In another embodiment, the layer may comprise a thin sheet of a silicon-cobalt alloy or a green layer of silicon-cobalt alloy particles formed by mechanical alloying having a low-melting eutectic or near eutectic composition.

Figure 7:
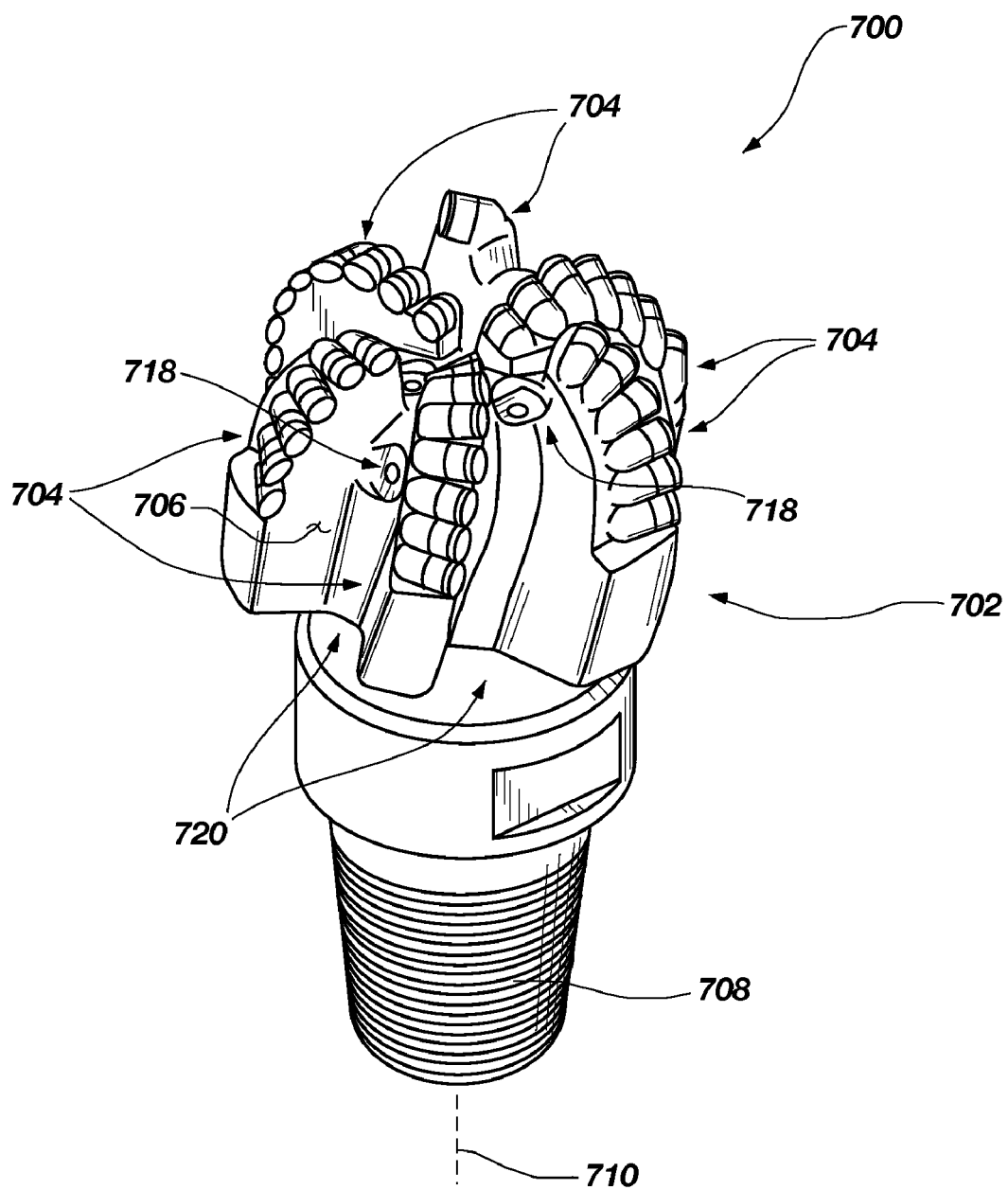
FIG. 7 is an isometric view of an embodiment of a rotary drill bit that may employ one or more of the disclosed PDC embodiments.
Figure 8:
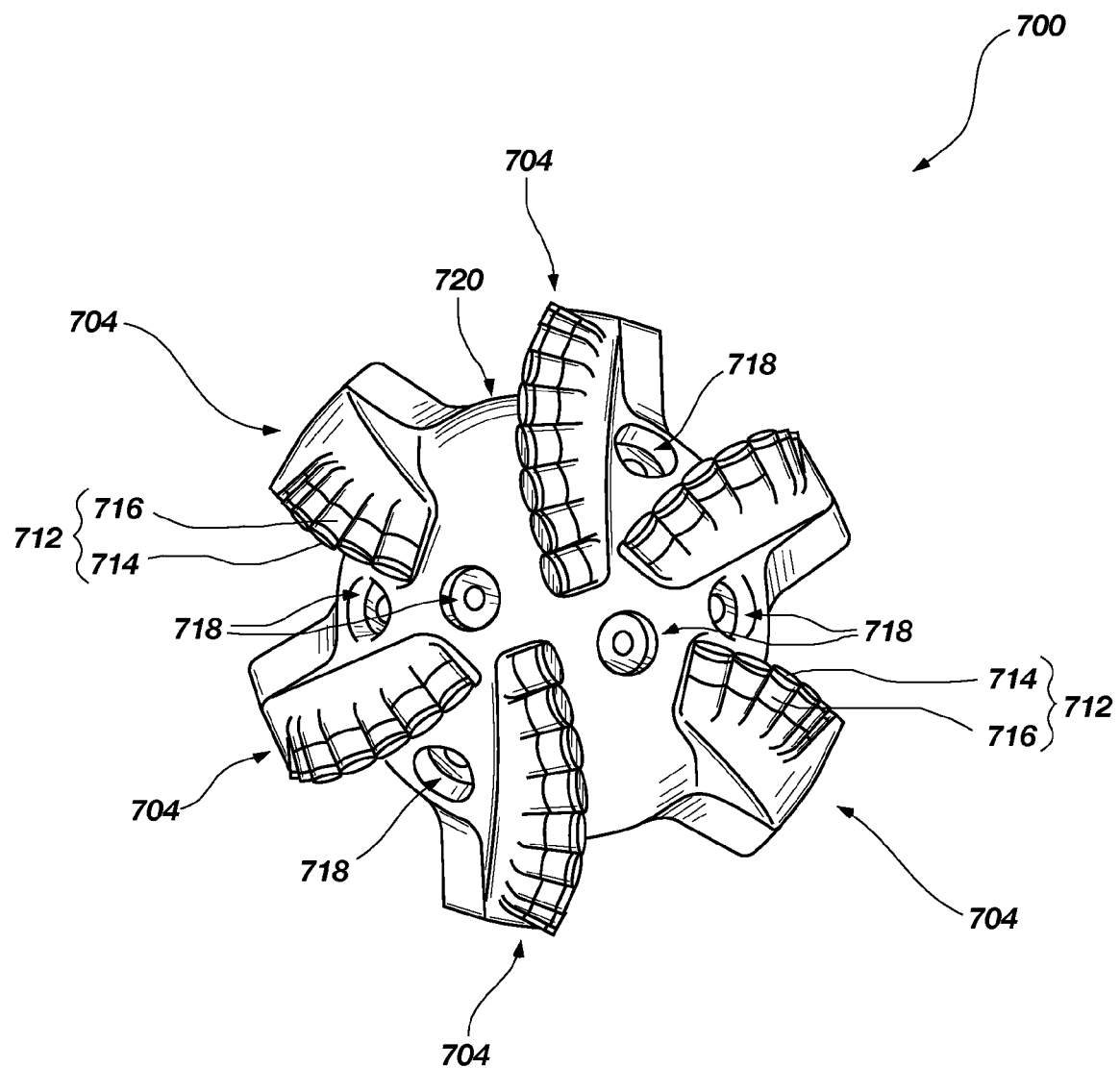
FIG. 8 is a top elevation view of the rotary drill bit shown in FIG. 7.

FIG. 7 is an isometric view and FIG. 8 is a top elevation view of an embodiment of a rotary drill bit 700 that includes at least one PDC configured according to any of the disclosed PDC embodiments. The rotary drill bit 700 comprises a bit body 702 that includes radially and longitudinally extending blades 704 having leading faces 706, and a threaded pin connection 708 for connecting the bit body 702 to a drilling string. The bit body 702 defines a leading end structure for drilling into a subterranean formation by rotation about a longitudinal axis 710 and application of weight-on-bit. At least one PDC, configured according to any of the disclosed PDC embodiments, may be affixed to the bit body 702. With reference to FIG. 8, each of a plurality of PDCs 712 is secured to the blades 704 of the bit body 702 (FIG. 7). For example, each PDC 712 may include a PCD table 714 bonded to a substrate 716. More generally, the PDCs 712 may comprise any PDC disclosed herein, without limitation. In addition, if desired, in some embodiments, a number of the PDCs 712 may be conventional in construction. Also, circumferentially adjacent blades 704 define so-called junk slots 720 therebetween. Additionally, the rotary drill bit 700 includes a plurality of nozzle cavities 718 for communicating drilling fluid from the interior of the rotary drill bit 700 to the PDCs 712.

FIGS. 7 and 8 merely depict one embodiment of a rotary drill bit that employs at least one PDC fabricated and structured in accordance with the disclosed embodiments, without limitation. The rotary drill bit 700 is used to represent any number of earth-boring tools or drilling tools, including, for example, core bits, roller-cone bits, fixed-cutter bits, eccentric bits, bi-center bits, reamers, reamer wings, or any other downhole tool including superabrasive compacts, without limitation.

The PDCs disclosed herein (e.g., PDC 100 of FIGS. 1A-1C) may also be utilized in applications other than cutting technology. For example, the disclosed PDC embodiments may be used in wire dies, bearings, artificial joints, inserts, cutting elements, and heat sinks. Thus, any of the PDCs disclosed herein may be employed in an article of manufacture including at least one superabrasive element or compact.

Thus, the embodiments of PDCs disclosed herein may be used in any apparatus or structure in which at least one conventional PDC is typically used. In one embodiment, a rotor and a stator, assembled to form a thrust-bearing apparatus, may each include one or more PDCs (e.g., PDC 100 of FIGS. 1A-1C) configured according to any of the embodiments disclosed herein and may be operably assembled to a downhole drilling assembly. U.S. Pat. Nos. 4,410,054; 4,560,014; 5,364,192; 5,368,398; and 5,480,233, the disclosure of each of which is incorporated herein, in its entirety, by this reference, disclose subterranean drilling systems within which bearing apparatuses utilizing PDCs disclosed herein may be incorporated. The embodiments of PDCs disclosed herein may also form all or part of heat sinks, wire dies, bearing elements, cutting elements, cutting inserts (e.g., on a roller-cone-type drill bit), machining inserts, or any other article of manufacture as known in the art. Other examples of articles of manufacture that may use any of the PDCs disclosed herein are disclosed in U.S. Pat. Nos. 4,811,801; 4,274,900; 4,268, 276; 4,468,138; 4,738,322; 4,913,247; 5,016,718; 5,092,687; 5,120,327; 5,135,061; 5,154,245; 5,460,233; 5,544,713; and 6,793,681, the disclosure of each of which is incorporated herein, in its entirety, by this reference.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall have the same meaning as the word "comprising" and variants thereof (e.g., "comprise" and "comprises").

What is claimed is:

1. A polycrystalline diamond compact, comprising:
   a substrate including an interfacial surface having a domed generally hemispherical raised region; and
   a polycrystalline diamond table bonded to the interfacial surface of the substrate, the polycrystalline diamond table defining an upper surface and exhibiting a thickness over the domed generally hemispherical raised region of about 1900 µm or less, the polycrystalline diamond table including a plurality of bonded diamond grains defining a plurality of interstitial regions, the polycrystalline diamond table further including,
      a first region adjacent to the substrate that includes metal-solvent catalyst disposed interstitially between the bonded diamond grains thereof; and
      a leached second region extending inwardly from the upper surface, the interstitial regions of the leached second region depleted of metal-solvent catalyst, the leached second region exhibiting a maximum leach depth, a ratio of the thickness of the polycrystalline diamond table to the maximum leach depth being about 1.25 to about 8.0.

2. The polycrystalline diamond compact of claim 1 wherein the thickness is a minimum thickness of the polycrystalline diamond table.

3. The polycrystalline diamond compact of claim 1 wherein the thickness of the polycrystalline diamond table is about 500 µm to about 1500 µm.

4. The polycrystalline diamond compact of claim 1 wherein the thickness of the polycrystalline diamond table is about 500 µm to about 800 µm.

5. The polycrystalline diamond compact of claim 1 wherein the polycrystalline diamond table comprises a peripheral region extending about a non-peripheral region that is located over the domed generally hemispherical raised region of the interfacial surface, a maximum thickness of the polycrystalline diamond table in the peripheral region being about 1.5 to about 3 times greater than the thickness of the polycrystalline diamond table in the non-peripheral region.

6. The polycrystalline diamond compact of claim 1 wherein the leached second region exhibits a leach depth profile in which the maximum leach depth that is greater than about 250 µm as measured from the upper surface.

7. The polycrystalline diamond compact of claim 1 wherein the leached second region exhibits a leach depth profile in which the maximum leach depth that is about 250 µm to about 400 µm as measured from the upper surface.

8. The polycrystalline diamond compact of claim 1 wherein the ratio of the thickness of the polycrystalline diamond table to the maximum leach depth is about 1.25 to about 4.0.

9. The polycrystalline diamond compact of claim 1 wherein a ratio of the volume of the domed generally hemispherical raised region to the volume of the polycrystalline diamond table is greater than or equal to 0.15.

10. The polycrystalline diamond compact of claim 1 wherein a ratio of a maximum height of the domed generally hemispherical raised region to a maximum thickness of the polycrystalline diamond table is greater than or equal to 0.20.

11. The polycrystalline diamond compact of claim 1 wherein a surface area of the domed generally hemispherical raised region comprises at least 60 percent of the surface area of the interfacial surface of the substrate.

12. The polycrystalline diamond compact of claim 1 wherein the leached second region comprises a non-peripheral region and a peripheral region extending about the non-peripheral region, a maximum leach depth in the peripheral region being about 5% to about 50% less than a maximum leach depth in the non-peripheral region.

13. The polycrystalline diamond compact of claim 1 wherein the domed generally hemispherical raised region of the interfacial surface of the substrate is generally centrally located.

14. The polycrystalline diamond compact of claim 1 wherein the polycrystalline diamond table exhibits residual compressive stresses at a level comparable to that if the interfacial surface was generally planar and the polycrystalline diamond table was unleached.

15. The polycrystalline diamond compact of claim 1 wherein the polycrystalline diamond table is integrally formed with the substrate.

16. The polycrystalline diamond compact of claim 1 wherein the polycrystalline diamond table is a pre-sintered polycrystalline diamond table.

17. The polycrystalline diamond compact of claim 1 wherein the leached second region of the polycrystalline diamond table comprises a replacement material disposed in the interstitial regions thereof.

18. The polycrystalline diamond compact of claim 1 wherein the polycrystalline diamond table comprises at least one peripheral surface, and the leached second region extends inwardly from and along a portion of the at least one peripheral surface.

19. The polycrystalline diamond compact of claim 1 wherein the substrate comprises a cemented carbide substrate.

20. A rotary drill bit, comprising:
a bit body configured to engage a subterranean formation; and
a plurality of polycrystalline diamond cutting elements affixed to the bit body, at least one of the polycrystalline diamond cutting elements including,
a substrate including an interfacial surface having a domed generally hemispherical raised region; and
a polycrystalline diamond table bonded to the interfacial surface of the substrate, the polycrystalline diamond table defining an upper surface and exhibiting a thickness over the domed generally hemispherical raised region of about 1900 μm or less, the polycrystalline diamond table including a plurality of bonded diamond grains defining a plurality of interstitial regions, the polycrystalline diamond table further including,
a first region adjacent to the substrate that includes metal-solvent catalyst disposed interstitially between the bonded diamond grains thereof; and
a leached second region extending inwardly from the upper surface, the interstitial regions of the leached second region depleted of metal-solvent catalyst, the leached second region exhibiting a maximum leach depth, a ratio of the thickness of the polycrystalline diamond table to the maximum leach depth being about 1.25 to about 8.0.

21. The rotary drill bit of claim 20 wherein the thickness is a minimum thickness of the polycrystalline diamond table.

22. The rotary drill bit of claim 20 wherein the thickness of the polycrystalline diamond table is about 500 μm to about 1500 μm.

23. The rotary drill bit of claim 20 wherein the thickness of the polycrystalline diamond table is about 500 μm to about 800 μm.

24. The rotary drill bit of claim 20 wherein the polycrystalline diamond table comprises a peripheral region extending about a non-peripheral region that is located over the domed generally hemispherical raised region of the interfacial surface, a maximum thickness of the polycrystalline diamond table in the peripheral region being about 1.5 to about 3 times greater than the thickness of the polycrystalline diamond table in the non-peripheral region.

25. The rotary drill bit of claim 20 wherein the leached second region exhibits a leach depth profile in which the maximum leach depth that is greater than about 250 μm as measured from the upper surface.

26. The rotary drill bit of claim 20 wherein the leached second region exhibits a leach depth profile in which the maximum leach depth that is about 250 μm to about 400 μm as measured from the upper surface.

27. The rotary drill bit of claim 20 wherein the ratio of the thickness of the polycrystalline diamond table to the maximum leach depth is about 1.25 to about 4.0.

28. The rotary drill bit of claim 20 wherein a ratio of the volume of the domed raised region to the volume of the polycrystalline diamond table is greater than or equal to 0.15.

29. The rotary drill bit of claim 20 wherein a ratio of a maximum height of the domed raised region to a maximum thickness of the polycrystalline diamond table is greater than or equal to 0.20.

30. The rotary drill bit of claim 20 wherein a surface area of the domed generally hemispherical raised region comprises at least 60 percent of the surface area of the interfacial surface of the substrate.

31. The rotary drill bit of claim 20 wherein the leached second region comprises a non-peripheral region and a peripheral region extending about the non-peripheral region, a maximum leach depth in the peripheral region being about 5% to about 50% less than a maximum leach depth in the non-peripheral region.

32. The rotary drill bit of claim 20 wherein the polycrystalline diamond table is integrally formed with the substrate.

33. The rotary drill bit of claim 20 wherein the polycrystalline diamond table is a pre-sintered polycrystalline diamond table.

34. The rotary drill bit of claim 20 wherein the leached second region of the polycrystalline diamond table comprises a replacement material disposed in the interstitial regions thereof.

35. A method of fabricating a leached polycrystalline diamond compact, comprising:
providing a polycrystalline diamond compact including,
a substrate including an interfacial surface having a domed generally elliptical raised region having a generally elliptical cross-sectional geometry; and
a polycrystalline diamond table bonded to the interfacial surface of the substrate, the polycrystalline diamond table defining an upper surface and exhibiting a thickness over the domed generally elliptical raised region of about 1900 μm or less, the polycrystalline diamond table including a plurality of bonded diamond grains defining a plurality of interstitial regions, the polycrystalline diamond table further including,
a first region adjacent to the substrate that includes metal-solvent catalyst disposed interstitially between the bonded diamond grains thereof; and
a second region extending inwardly from the upper surface that includes metal-solvent catalyst disposed interstitially between the bonded diamond grains thereof; and
leaching at least a portion of the metal-solvent catalyst from the second region of the polycrystalline diamond table so that the second region exhibits a maximum leach depth, wherein a ratio of the thickness of the polycrystalline diamond table to the maximum leach depth being about 1.25 to about 8.0.

36. The method of claim 35 wherein leaching at least a portion of the metal-solvent catalyst from the second region of the polycrystalline diamond table comprises leaching the second region so that the ratio of the thickness of the polycrystalline diamond table to a maximum leach depth of the second region is about 1.25 to about 4.0.

37. A polycrystalline diamond compact, comprising:
a substrate including an interfacial surface having a domed generally elliptical raised region having a generally elliptical cross-sectional geometry and a peripheral region; and
a polycrystalline diamond table bonded to the interfacial surface of the substrate, the polycrystalline diamond table defining an upper surface, the polycrystalline diamond table exhibiting a first thickness over the domed generally elliptical raised region and a second thickness over the peripheral region of about 1125 μm to about 5700 μm that is greater than the first thickness, the polycrystalline diamond table including a plurality of bonded diamond grains defining a plurality of interstitial regions, the polycrystalline diamond table further including, a first region adjacent to the substrate that includes metal-solvent catalyst disposed interstitially between the bonded diamond grains thereof; and a leached second region extending inwardly from the upper surface, the interstitial regions of the leached second region depleted of metal-solvent catalyst, the leached second region exhibiting a maximum leach depth, a ratio of the first thickness of the polycrystalline diamond table to the maximum leach depth being about 1.25 to about 8.0.

* * * * *